Patented Oct. 3, 1950

2,524,733

UNITED STATES PATENT OFFICE 2,524,733

FLUORESCENT COATING MATERIAL CONTAINING ETHYL CELLULOSE

Elmer C. Payne, Marblehead, Malcolm L. Hayes, Hamilton, and Kenneth Demb, Salem, Mass., assignors to Sylvania Electric Products Inc., Salem, Mass., a corporation of Massachusetts No Drawing. Application February 2, 1945, Serial No. 575,937

2 Claims. (Cl. 252—301.3)

This invention relates to a fluorescent coating material and its method of preparation and has for its general object to provide a coating of maximum luminosity, and life.

A further object of the invention is to provide a fluorescent coating which has maximum adaptability to manufacturing procedure.

A further object of the invention is to provide a fluorescent coating which can be produced and applied at a cost substantially less than that of existing coating material.

Other objects and features will more fully appear from the following description and will be particularly pointed out in the claims.

In the production of fluorescent lamps or other electronic devices having fluorescent areas the kind and quality of the materials used and the manufacturing procedure is highly critical and prior to the present invention was subject to variations which do not come within allowable tolerances.

The practice of the present invention insures the production of a highly uniform and efficient product. To insure that the fluorescent powder used will produce its maximum lumen output and that a permanent and uniform coating is applied to the lamp surface the temporary binder for the powder must possess the necessary qualifications.

The present invention provides a material which when prepared and used according to the procedure to be outlined herein provides a coating having all the desirable characteristics for maximum efficiency. A fluorescent powder having the desired light quality is used and it is mixed with the required quantity of ethyl cellulose dissolved in suitable solvents. The coating material thus prepared is flowed or otherwise applied to the inner wall or other surface to be treated.

To present a better understanding of the invention a specific form thereof will be described. Due to the fact that available commercial supplies of ethyl cellulose are not pure the first step in the coating procedure is to purify the ethyl cellulose. The impurities in the commercial form of ethyl cellulose are chiefly metal salts such as sodium. A great difficulty in the purification of this material lies in the fact that the natural solvents for the material itself do not dissolve the impurities therein. To effectively remove the impurities the ethyl cellulose is first dissolved. The solvent used may be any of the commercial alcohols or acetone. While in its liquid state the material is mechanically subdivided to present a maximum of surface area at which time it is washed in a liquid which acts to dissolve the impurities in the ethyl cellulose.

The washed and purified material is then dried and is ready for use in the coating material.

In the step of purification of the ethyl cellulose it has been suggested above that the material in its liquid state be subdivided. This may be accomplished in any desired manner. A highly efficient means for obtaining the proper result is to extrude the liquid through one or more fine jet openings in a suitable nozzle. The finely divided material is then immediately subjected to the washing action of a dilute solution of acid the dilution of which may be as low as one tenth per cent. Any suitable acid may be used such as hydrochloric, nitric or acetic. An efficient manner of executing this operation is to immerse the nozzle directly in the dilute acid contained in a vessel. Desirably the acid is mechanically agitated during the washing operation to accelerate the process.

Immediately upon emerging from the nozzle and contacting the acid solution the ethyl cellulose is caused to gradually change its physical form. The water in the acid removes the solvent from the material and the acid penetrates it acting as it does to dissolve and remove the impurities therefrom. This action of the water and acid is a continuing action proceeding until the material has been penetrated deeply. Thus a high percentage of the impurities in the material are removed.

After the washing period the acid solution is removed and desirably the material is rinsed with pure water. The material is then dried after which it is ready for use in the preparation of the coating material.

To prepare the fluorescent coating material the purified ethyl cellulose is dissolved in a suitable solvent such as approximately 3% ethyl cellulose, 90% toluol or xylol and 7% alcohol and diluted to the desired consistency. A fluorescent powder having the desired light emitting qualities is prepared in the conventional manner and the powder and ethyl cellulose are then mixed together.

The coating material thus prepared is then transferred to a coating apparatus where it is applied to the surface to be treated such as the interior walls of a fluorescent lamp. Desirably the material is diluted to a consistency suitable for flowing upon the surface to be coated.

To complete the processing of the fluorescent surface the coating may be treated in the conventional manner. In the manufacture of fluorescent lamps for example, the coated tubes are baked at a temperature which burns and eliminates all of the ethyl cellulose leaving only the pure fluorescent powder.

The lumen output of the surface coated is dependent upon many factors one of the most important of which is the purity and uniformity of the fluorescent material after its temporary binder has been removed. The ingredients of the coating material should therefore be chosen to insure that the completed fluorescent surface should have maximum luminescence.

Before the present invention certain materials have been used which are not satisfactory. For example, nitrocellulose has been widely used as a temporary binder for the coating material. This material does not lend itself readily to such use. After application a coating containing nitrocellulose tends to shrink and pull away from its surface. To overcome this condition plasticisers must be added. The plasticisers, however, are difficult to remove in the baking process and consequently the efficiency of the fluorescent surface thus prepared is substantially reduced. Furthermore, in the baking step the nitrocellulose gives off nitrogen oxide which tends to combine with and oxidize the fluorescent powder which lowers its luminescent efficiency.

In contrast to the disadvantages of other temporary binders such as nitrocellulose, ethyl cellulose, does not shrink in drying and gives off inert carbon dioxide when it is removed by baking and when removed leaves no residue or compounds to impair the function of the fluorescent powder.

The coating of the present invention not only is of extremely high efficiency and readily applied at the lowest possible cost, but the life of the fluorescent surface applied according to the invention is equal to or exceeds that of coatings applied prior to the invention.

What we claim is:

1. A fluorescent coating material for fluorescent lamps consisting of ethyl cellulose substantially entirely free of metallic salt impurities dissolved in an aromatic hydrocarbon and alcohol, about 90% being the aromatic hydrocarbon, a fluorescent powder mixed with said solution and the whole diluted to a consistency suitable for flowing upon the surface of the lamp envelope.

2. A fluorescent coating material for fluorescent lamps consisting of ethyl cellulose substantially entirely free of metallic salt impurities dissolved in a solvent consisting of about 90% xylol and a small portion of ethyl cellulose and alcohol and fluorescent powder mixed with said solution.

ELMER C. PAYNE.
MALCOLM L. HAYES.
KENNETH DEMB.

REFERENCES CITED

The following references are of record in the file of this patent:

UNITED STATES PATENTS

| Number | Name | Date |
|---|---|---|
| 1,599,508 | Altwell | Sept. 14, 1926 |
| 1,679,943 | Prachel | Aug. 7, 1928 |
| 2,039,734 | Meder | May 5, 1936 |
| 2,118,663 | Bradshaw | May 24, 1938 |
| 2,310,740 | Leavy | Feb. 9, 1943 |
| 2,341,403 | Williams | Feb. 8, 1944 |

OTHER REFERENCES

"Ethocel Handbook," pp. 1 and 11–16. 1940. By Dow Chemical Company, Midland, Michigan.